United States Patent
Haeusler et al.

(10) Patent No.: US 11,437,678 B2
(45) Date of Patent: Sep. 6, 2022

(54) BATTERY MODULE AND A TRACTION BATTERY

(71) Applicant: Mahle International GmbH, Stuttgart (DE)

(72) Inventors: Ingo Haeusler, Esslingen (DE); Dierk Hoffmann, Leonberg (DE); Tilman Kaiser, Leinfelden-Echterdingen (DE); Ruediger Knauss, Kernen i.R. (DE)

(73) Assignee: Mahle International GmbH

( * ) Notice: Subject to any disclaimer, the term of this patent is extended or adjusted under 35 U.S.C. 154(b) by 108 days.

(21) Appl. No.: 16/914,271

(22) Filed: Jun. 27, 2020

(65) Prior Publication Data
US 2020/0411821 A1 Dec. 31, 2020

(30) Foreign Application Priority Data
Jun. 28, 2019 (DE) .................. 10 2019 209 527.5
Sep. 26, 2019 (DE) .................. 10 2019 214 744.5

(51) Int. Cl.
| | |
|---|---|
| *B60K 1/00* | (2006.01) |
| *H01M 50/20* | (2021.01) |
| *B60K 1/04* | (2019.01) |
| *B60K 6/28* | (2007.10) |
| *B60L 50/60* | (2019.01) |

(Continued)

(52) U.S. Cl.
CPC .............. *H01M 50/20* (2021.01); *B60K 1/04* (2013.01); *B60K 6/28* (2013.01); *B60L 50/66* (2019.02); *B60L 58/26* (2019.02); *B62D 25/20* (2013.01); *H01M 10/613* (2015.04); *H01M 10/625* (2015.04); *H01M 50/10* (2021.01);

(Continued)

(58) Field of Classification Search
CPC ............. H01M 10/613; H01M 10/052; H01M 10/625; H01M 50/20; B60L 50/64; B60L 50/66; B60K 1/04; B60K 6/28
USPC ........................................ 180/68.5
See application file for complete search history.

(56) References Cited

U.S. PATENT DOCUMENTS

| | | | |
|---|---|---|---|
| 9,112,208 B2 * | 8/2015 | Kohlberger | ......... H01M 10/613 |
| 2004/0096715 A1 * | 5/2004 | Herdtle | ............. H01M 8/04029 |
| | | | 429/435 |

(Continued)

FOREIGN PATENT DOCUMENTS

| | | |
|---|---|---|
| DE | 10 2014 016 238 A1 | 5/2016 |
| DE | 10 2018 215 036 A1 | 3/2019 |
| JP | 2014-139 881 A | 7/2014 |

OTHER PUBLICATIONS

English abstract for JP-2014-139 881.
English abstrac tfor DE-10 2014 016 238.

*Primary Examiner* — Hau V Phan
(74) *Attorney, Agent, or Firm* — Fishman Stewart PLLC

(57) ABSTRACT

A battery module for a traction battery may include a module housing through which a coolant is flowable and at least one battery cell stack arranged within an interior space of the module housing. The at least one battery cell stack may include a plurality of battery cells arranged one after another along a stack direction. The plurality of battery cells may be arranged within the module housing such that a coolant flowable through the module housing directly contacts the plurality of battery cells. A locking mechanism may form-fittingly connect the at least one battery cell stack to the module housing via (i) a plurality of housing-side locking points and (ii) a plurality of stack-side locking points.

18 Claims, 6 Drawing Sheets

(51) Int. Cl.
  *B60L 58/26* (2019.01)
  *B62D 25/20* (2006.01)
  *H01M 10/613* (2014.01)
  *H01M 10/625* (2014.01)
  *H01M 50/10* (2021.01)

(52) U.S. Cl.
  CPC .......... *B60K 2001/005* (2013.01); *B60K 2001/0438* (2013.01); *H01M 2220/20* (2013.01)

(56) References Cited

U.S. PATENT DOCUMENTS

| | | | |
|---|---|---|---|
| 2009/0152034 A1* | 6/2009 | Takasaki | B60L 50/66 |
| | | | 180/68.5 |
| 2014/0220391 A1* | 8/2014 | Fujii | H01M 10/6554 |
| | | | 429/7 |
| 2016/0093843 A1* | 3/2016 | Reineccius | H01M 10/052 |
| | | | 429/61 |
| 2018/0123197 A1* | 5/2018 | Liptak | B60L 50/64 |
| 2018/0138559 A1* | 5/2018 | Omura | H01M 10/647 |
| 2018/0215282 A1* | 8/2018 | Pohl | H01M 10/613 |
| 2018/0226701 A1* | 8/2018 | Inoue | H01M 10/625 |
| 2018/0226702 A1* | 8/2018 | Inoue | B60L 58/26 |
| 2019/0074497 A1 | 3/2019 | Haeusler et al. | |

\* cited by examiner

BATTERY MODULE AND A TRACTION BATTERY

CROSS-REFERENCE TO RELATED APPLICATIONS

This application claims priority to German Patent Application No. DE 10 2019 214 744.5, filed on Sep. 26, 2019, and German Patent Application No. DE 10 2019 209 527.5, filed on Jun. 28, 2019, the contents of both of which are hereby incorporated by reference in their entirety.

TECHNICAL FIELD

The invention relates to a battery module for a traction battery, in particular for an electric or hybrid vehicle. The invention also relates to a traction battery for the electric or hybrid vehicle with the battery module.

BACKGROUND

Traction batteries with battery modules for electric or hybrid vehicles are already known from the prior art. There, a battery module usually comprises a battery cell stack and a module housing, wherein the battery cell stack comprises multiple battery cells stacked against one another and is arranged within the module housing. During the operation, waste heat is generated in the battery cells which has to be discharged to the outside. To this end, the battery cells can be directly circulated about by the coolant within the module housing and because of this directly incorporated in a cooling circuit. The cooling circuit comprises a pump for delivering coolant and further components—such as a cooler, a chiller, valves or a filter. There, the module housing is subjected to the delivery pressure of the pump so that large surfaces of the module housing can bulge out despite provided stiffening structures. By way of the bulging-out, unintentional bypass flows of the coolant can develop in the module housing so that some of the battery cells can be no longer or no longer adequately cooled. Furthermore, such a bulging-out can cause mechanical damage to the module housing in an extreme case.

From DE 10 2018 215 036 A1 a module housing is known for example in which the bulging-out is reduced by tie rods. The tie rods connect opposite housing parts of the module housing through the batter cell stack to one another. By way of this, the tie rods achieve a further stiffening of the module housing and diminish its bulging-out. Disadvantageously, large surfaces of the module housing also remain not connected here and can bulge out by the delivery pressure of the pump. Since the tie rods for assembly and disassembly have to be freely accessible, introducing further tie rods of this type however is very involved.

SUMMARY

The object of the invention therefore is to state an improved or at least alternative embodiment for a battery module of the generic type, with which the described disadvantages are overcome. In particular, further connecting points are to be created between the battery cell stack and parts of the module housing that are inaccessible in the assembled state. Furthermore, the number and the position of these connecting points is to be adaptable as required—for example defined by strength simulation. In addition, assembly and disassembly of the battery cell stack in the module housing should not be rendered unnecessarily complicated. A further object of the invention is to provide a corresponding traction battery.

According to the invention, these objects are solved through the subject matter of the independent claim(s). Advantageous embodiments are the subject matter of the dependent claim(s).

A generic battery module is provided for a traction battery, in particular for an electric or hybrid vehicle. The battery module comprises a module housing and at least one battery cell stack, which is arranged within an interior space of the module housing. The batter cell stack comprises multiple battery cells which follow one another along a stack direction. The module housing can be flowed through in particular directly by a coolant in such a manner that the battery cells come into direct contact with the coolant. According to the invention, a locking device of the battery module form-fittingly connects the battery cell stack via multiple housing-side locking points and via multiple stack-side locking points to the module housing.

The locking device is form-fittingly connected at the stack-side locking points to the battery cell stack and at the housing-side locking points to the module housing. Because of this, the battery cell stack and the module housing are connected to one another by means of the locking device at the multiple stack-side locking points and at the multiple housing-side locking points. By way of this, the stability and the stiffness of the module housing can be increased and the undesirable bulging-out of the module housing advantageously prevented. In particular, a mechanical damage of the module housing that can occur in an extreme case can be effectively counteracted. Furthermore, the module housing can be advantageously flowed through along provided paths and the battery cells of the battery cell stack efficiently cooled. The battery cell stack is directly fastened to the module housing through the locking device, so that the housing-side locking points and the stack-side locking points as such need not be accessible from the outside. Because of this, assembly and disassembly can take place in a simplified manner.

The housing-side locking points and/or the stack-side locking points can each be arranged in a row or in multiple rows along the stack direction. In the respective rows, the number of the respective locking points can be different and/or the distance of the respective adjacent locking points to one another deviate. The number of the housing-side locking points and the number of the stack-side locking points can also deviate from one another. By way of this, the stability and the stiffness of the module housing can be adapted depending on the requirements that are present.

Advantageously it can be provided that the locking device in the interior space comprises multiple housing-side first engagement elements and multiple stack-side second engagement elements. The housing-side first engagement elements are distributed along the stack direction and arranged fixed on the module housing. The multiple stack-side second engagement elements are distributed along the stack direction and arranged fixed on the battery cell stack. In addition, the locking device comprises a bolt plate which comprises first bolt structures that are complementary to the housing-side first engagement elements and second bolt structures that are complementary to the stack-side second engagement elements. Thus, the bolt plate is in engagement with the module housing via the housing-side first engagement elements and the first bolt structures and in engagement with the battery cell stack via the stack-side second engagement elements and the second bolt structures.

Advantageously, the battery cell stack is brought into engagement with the module housing indirectly via the bolt plate. The housing-side first engagement elements and the stack-side second engagement elements are arranged distributed along the stack direction, so that the bolt plate can be moveable in the stack direction relative to the module housing and/or to the battery cell stack. In particular, the engagement between the housing-side first engagement elements and the first bolt structures and/or between the stack-side second engagement elements and the second bolt structures can be established and disengaged through a movement of the bolt plate in the stack direction. Assembly and disassembly can thus take place advantageously indirectly via the bolt plate. The housing-side first engagement elements and the first bolt structures form, in the engagement, the housing-side locking points. The stack-side second engagement elements and the second bolt structures form in the engagement the stack-side locking points.

Advantageously it can be provided that the housing-side first engagement elements and the first bolt structures are permanently in engagement with one another and form the housing-side locking points. Here, the housing-side locking points define a longitudinal guide for the bolt plate and transmit tensile forces running transversely to the stack direction in a tensile force direction between the bolt plate and the module housing. Here, the longitudinal guide is realised in the stack direction. In other words, the bolt plate is not detachable from the module housing but can be adjusted in the stack direction relative to the module housing. It can be provided that the bolt plate is adjustable parallel to the stack direction relative to the module housing between a locking position and an unlocking position. In the locking position of the bolt plate, the stack-side second engagement elements and the second bolt structures are in engagement and form the stack-side locking points, so that tensile forces running transversely to the stack direction in a tensile force direction are transmittable between the bolt plate and the battery cell stack. In the unlocking position of the bolt plate, the second bolt structures are disengaged from the stack-side second engagement structures so that the battery cell stack is removable from the bolt plate in the tensile force direction.

When the battery cell stack is mounted in the module housing, the bolt plate on the module housing is first brought into the unlocking position or adjusted along the stack direction into the unlocking position. Then, the battery cell stack is arranged in the module housing. In the process, the stack-side second engagement elements and the second bolt structures are orientated relative to one another in such a manner that during the adjusting of the bolt plate from the unlocking position into the locking position the same can be brought into engagement. Following this, the bolt plate is brought or adjusted out of the unlocking position into the locking position and the stack-side second engagement elements and the second bolt structures brought into engagement with one another. By way of this, the battery cell stack can be form-fittingly connected to the module housing in a simplified manner with reduced effort. During the disassembly, the bolt plate is then brought out of the locking position into the unlocking position or adjusted along the stack direction into the unlocking position. By way of this, the engagement between the stack-side second engagement elements and the second bolt structures is disengaged. The battery cell stack can then be disconnected from the module housing.

The assembly and the disassembly advantageously take place indirectly via the bolt plate, so that no additional fixing of the battery cell stack and the module housing—such as for example screwing—to one another is necessary. In addition, the housing-side and the stack-side locking points need not be accessible from the outside per se, so that their number and their position are freely adaptable to the desired stiffening of the module housing. Furthermore, the battery cell stack is form-fittingly connected at the multiple stack-side locking points to the module housing and tensile forces running transversely to the stack direction can be transmitted between the module housing and the battery cell stack. The multiple stack-side locking points and the multiple housing-side locking points prevent an undesirable bulging-out of the module housing, so that the battery cell stack or the battery cells in the module housing can be cooled efficiently. Furthermore, any risk of a mechanical damage to the module housing can be minimised.

In addition, an actuating device for adjusting and/or for driving the bolt plate between the unlocking position and the locking position can be provided. With respect to the stack direction and/or transversely to the tensile force direction, the actuating device can be preferentially arranged centrally on the battery cell stack. The actuating device can comprise an eccentric, which is rotatable about an axis of rotation running parallel to the tensile force direction and thereby drive-coupled to the bolt plate. The eccentric is additionally accessible from the outside of the module housing. For example, the eccentric engages in a driver opening spaced apart radially to the axis of rotation, which is formed in the bolt plate. Here, the eccentric can penetrate the bolt plate in an elongated hole, as a result of which a longitudinal guide for the bolt plate on the eccentric is created as well. In particular, the eccentric can penetrate the battery cell stack parallel to the tensile force direction. Alternatively, the actuating device can comprise a slide, which is slidably arranged along the stack direction and in the process is drive-coupled to the bolt plate. The slide is practically accessible from an outside of the module housing. It is also conceivable that the actuating device comprises an actuator. The actuator can be pneumatic or electric and actuated via an electronic control system. The actuator need not be accessible from an outside of the module housing.

Advantageously it can be provided that the housing-side first engagement elements are formed by mushroom-like structures, preferentially by screws. The mushroom-like structures comprise a head and a shank, wherein the cross section of the head is larger than the cross section of the shank. The first bolt structures are then formed by elongated holes running parallel to the stack direction. The respective shank is fastened to the module housing and penetrates the associated elongated hole, so that the head is arranged on a side of the bolt plate facing the battery cell stack where it engages behind the bolt plate transversely to the tensile force direction. In this way, the bolt plate is permanently fixed on the module housing and can be slid relative to the module housing. The respective elongated holes are orientated in the stack direction so that a longitudinal guide of the bolt plate is realised in the stack direction.

Advantageously it can be provided that the stack-side second engagement elements are formed by a T-shaped or L-shaped web, which extends transversely to the stack direction and transversely to the tensile force direction. The second bolt structures of the bolt plate are then formed by passage openings that are complementary thereto. In the locking position of the bolt plate, a portion of the web and the associated passage opening then engage behind a side of the bolt plate facing away from the battery cell stack, so that a form-fitting connection materialises in the tensile force direction. Here, the portion of the respective web is arranged with respect to the tensile force direction between the module housing and the bolt plate.

Advantageously it can be provided that within the battery cell stack the individual battery cells are each positioned against one another and held against one another by means of a cell holder. The stack-side second engagement elements are then formed on the cell holders. The respective cell holders can be arranged between the battery cells and stacked with these in the stack direction. Here, the cell holders can each comprise a frame or a collar which engages about or runs about the respective battery cell or the respective adjacent battery cells with respect to the stack direction in the circumferential direction. The respective adjacent cell holders can inter-engage in the stack direction so that the battery cells and the cell holders are fixed relative to one another. The stack-side second engagement elements are then formed on the cell holders. Advantageously, each third or each second or all cell holders can comprise or form the stack-side second engagement element.

In the configuration of the battery module it is conceivable that the battery module receives only a single battery cell stack. The sole battery cell stack is then form-fittingly connected to the module housing by means of the locking device. However it is also conceivable that the module housing receives multiple battery cell stacks. The multiple battery cell stacks can then be form-fittingly connected to the module housing via a separate locking device each.

Advantageously it can be provided that the module housing comprises a first housing part and a second housing part fitting the former. The first housing part and the second housing part then enclose the interior space in which the at least one battery cell stack is arranged. The first housing part is preferably configured as a container that is open towards the bottom. The second housing part is preferably configured as a cover with which a housing opening of the first housing can be closed off. If the battery module comprises multiple battery cell stacks, the first housing part can comprise multiple interior spaces for the respective multiple battery cell stacks. Additionally, the second housing part can be formed by multiple covers which close off the respective housing openings of the first housing part. Preferentially, the first housing part is provided for the vehicle-side arranging or for fixing on a vehicle floor of the electric or hybrid vehicle. Preferably, the locking device is located on an inner side of the module housing facing the interior space. The locking device is then located at a point that is inaccessible with the closed module housing per se. By way of the actuating device the bolt plate however can be adjusted between the unlocking position and the locking position from an outside of the module housing.

In an advantageous embodiment of the module housing, the housing-side first engagement elements can be formed on the first housing part. When the module is arranged on the electric or hybrid vehicle or fixed on the vehicle floor of the electric or hybrid vehicle, the weight of the respective battery cell stack is transmitted to the first housing part via the locking device. The tensile force or the tensile force direction is then directed from the top down. Advantageously, the battery cell stack can then be attached fixed, in particular non-detachably, on the second housing part. The term non-detachably in this context means that the connection between the battery cell stack and the second housing part cannot be separated without serious damage to at least one of the two connecting partners. For example the battery cell stack is glued to the second housing part. Here, the locking device is located between the first housing part and the battery cell stack. If the actuating device comprises an eccentric or a slide, this can penetrate the battery cell stack or however be arranged laterally on the battery cell stack.

In a further advantageous embodiment of the module housing, the housing-side first engagement elements can be formed on the second housing part. The second housing part is then detachably fixed on the first housing part. Preferentially, the second housing part is screwed to the first housing part. If the module housing is arranged on the electric or hybrid vehicle or fixed on the vehicle floor of the electric or hybrid vehicle, the weight of the respective battery cell stack is supported by the second housing part. The tensile force or the tensile force direction is then directed from the top down. Here, the locking device is located between the second housing part and the battery cell stack. When the actuating device comprises an eccentric or a slide, the same does not have to penetrate the battery cell stack.

The invention also relates to a traction battery for an electric or hybrid vehicle. Here, the traction battery comprises at least one battery module described above.

The traction battery can advantageously comprise only a single battery module so that the battery module forms the traction battery. Advantageously it can be provided here that the module housing of the battery module receives multiple battery cell stacks which can each be fixed to the module housing via a separate locking device. The module housing is then designed for fixing to a vehicle floor of the electric or hybrid vehicle. Practically, the module housing is configured divisible in vehicle Z-direction and comprises the first housing part for fixing to the vehicle floor and the second housing part. The first housing part can be mounted, open towards the bottom, on the vehicle floor, for example screwed. The respective battery cell stack can then be form-fittingly connected to the first housing part or to the second housing part via the locking device. The tensile force direction then extends from the top down. A housing opening of the first housing pat is then closed off from the bottom with the second housing part. Alternatively, the traction battery can comprise multiple battery modules. Then, the battery modules with their battery housings can be accommodated in a common battery housing. Advantageously, the battery housing can then be open on one side and the open side of the battery housing be closed off with the respective module housings. In other words, the second housing parts of the respective battery modules can close off both the respective module housings and also the battery housing of the traction battery in certain regions.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
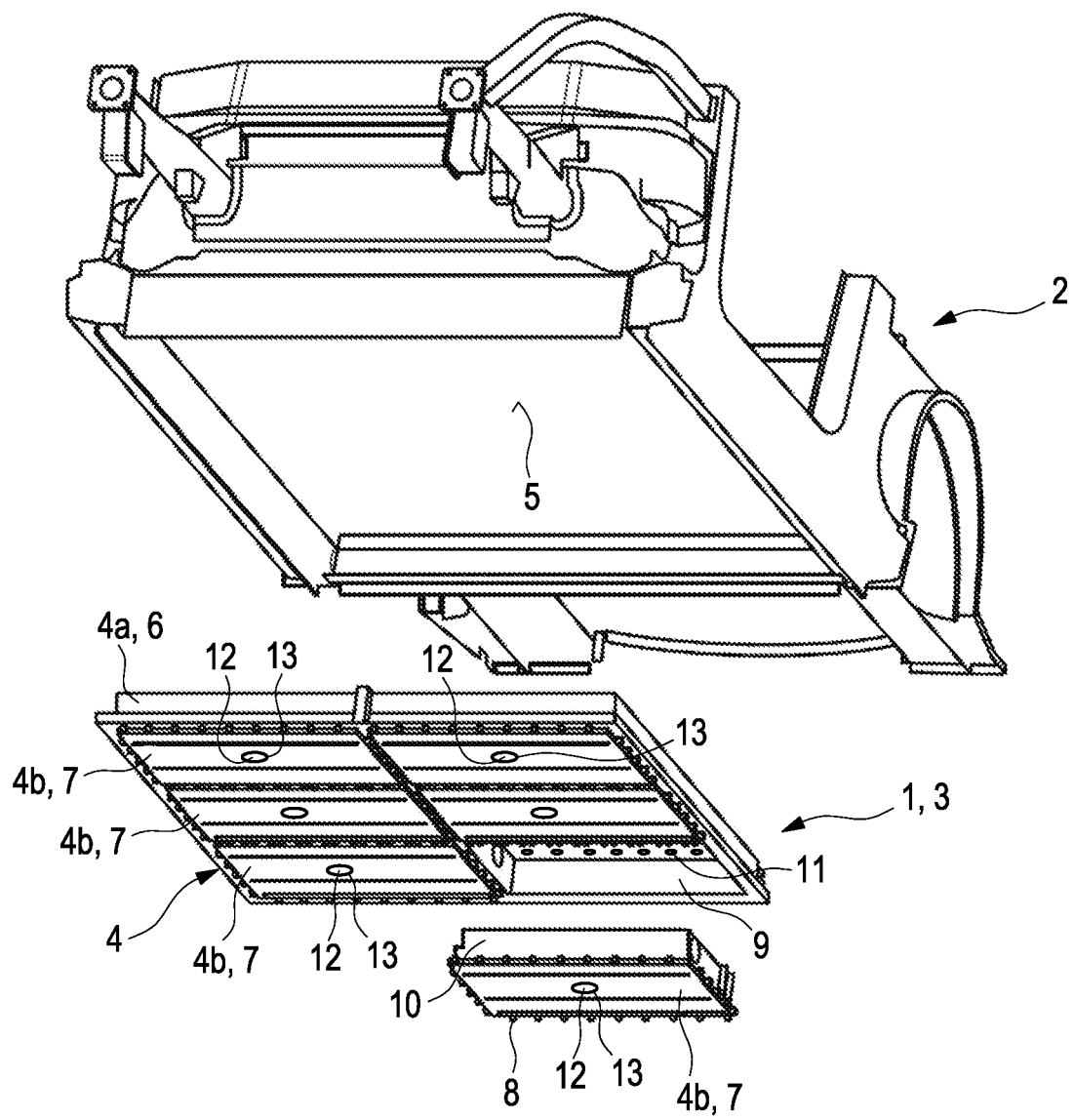
FIG. 1 shows an exploded view of a traction battery having a battery module according to the invention in a first embodiment.

FIG. 1 shows an exploded view of a traction battery 1 on a hybrid or electric vehicle 2. The traction battery 1 in this exemplary embodiment is formed by a single battery module 3. Here, the battery module 3 comprises a module housing 4 which encloses a first housing part 4a and a second housing part 4b. The first housing part 4a is provided for fixing the traction battery 1 on a vehicle floor 5 and is formed by a container 6. The second housing part 4b is formed by multiple covers 7 which close off an open housing side of the first housing part 4a. To this end, the covers 7 are screwed to the container 6 in multiple locations 8. In the first housing part 4a, multiple interior spaces 9 are formed which are provided for receiving a battery cell stack 10 of the battery module 3 each. The module housing 4 or the individual interior spaces 9 can be flowed through by a coolant so that the battery cell stacks 10 come into direct contact with the coolant.

The respective battery cell stacks 10 are form-fittingly connected to the module housing 4 via a locking device 11 each, as is explained in more detail in the following. Here, the locking device 11 is arranged within the module housing 4 and can lock the battery cell stack 10 with the module housing 4 or unlock the same from the module housing 4. This is effected through a drain opening 13 closed off with plugs 12, as is explained in more detail in the following. In FIG. 1, the locking device 11 is arranged on the first housing part 4a and thus between the container 6 and the battery cell stack 10 within the respective interior space 9. This corresponds to a first embodiment of the battery module 3 which is explained in more detail by way of FIG. 2 to FIG. 5. Alternatively, the locking device 11 can be arranged on the second housing part 4b and thus between the respective cover 7 and the battery cell stack 10. This then corresponds to a second embodiment of the battery module 3 which is explained in more detail by way of FIG. 6.

Figure 2:
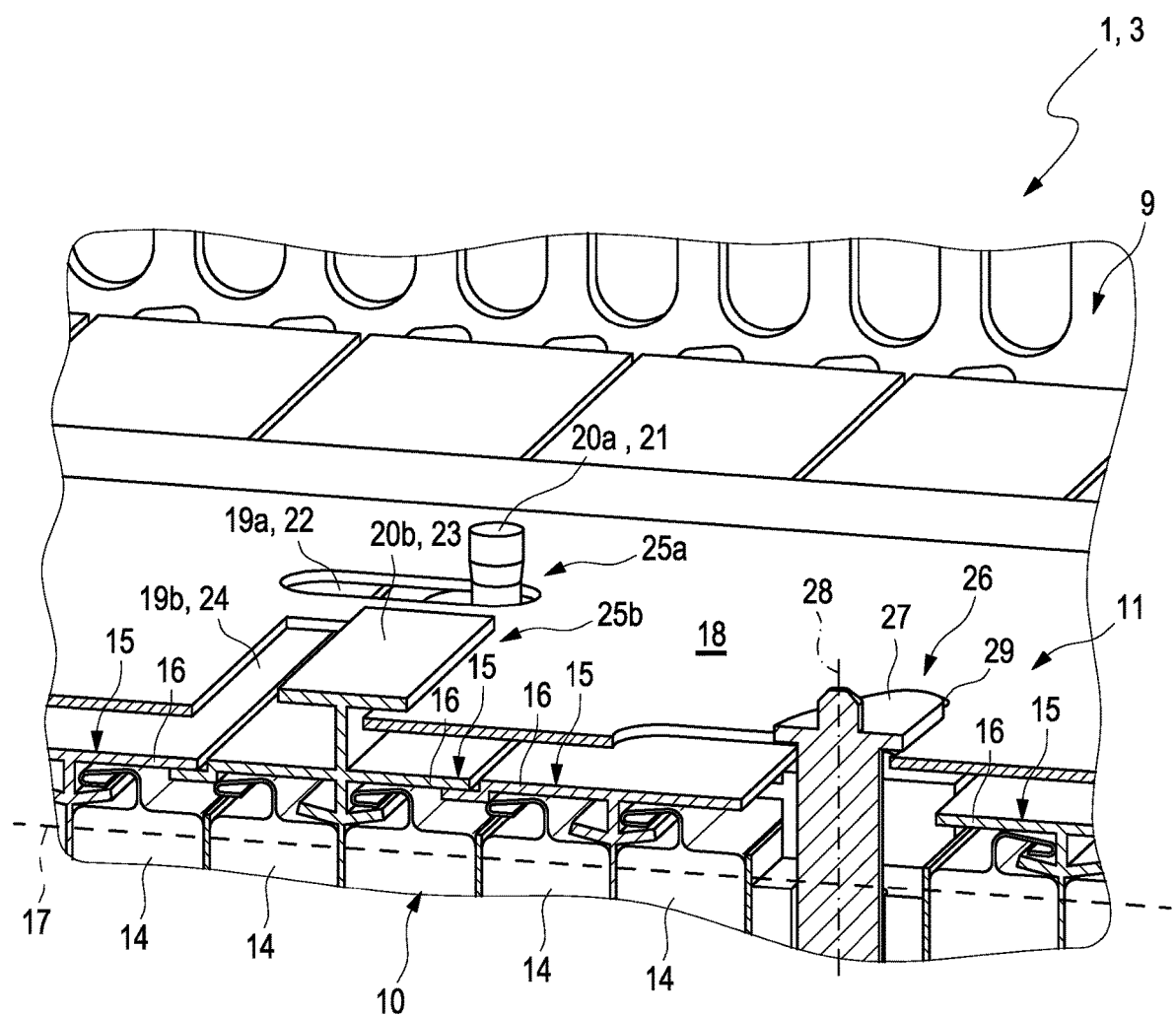
FIG. 2 and FIG. 3 show sectional views of the battery module according to the invention in the first embodiment.
Figure 3:
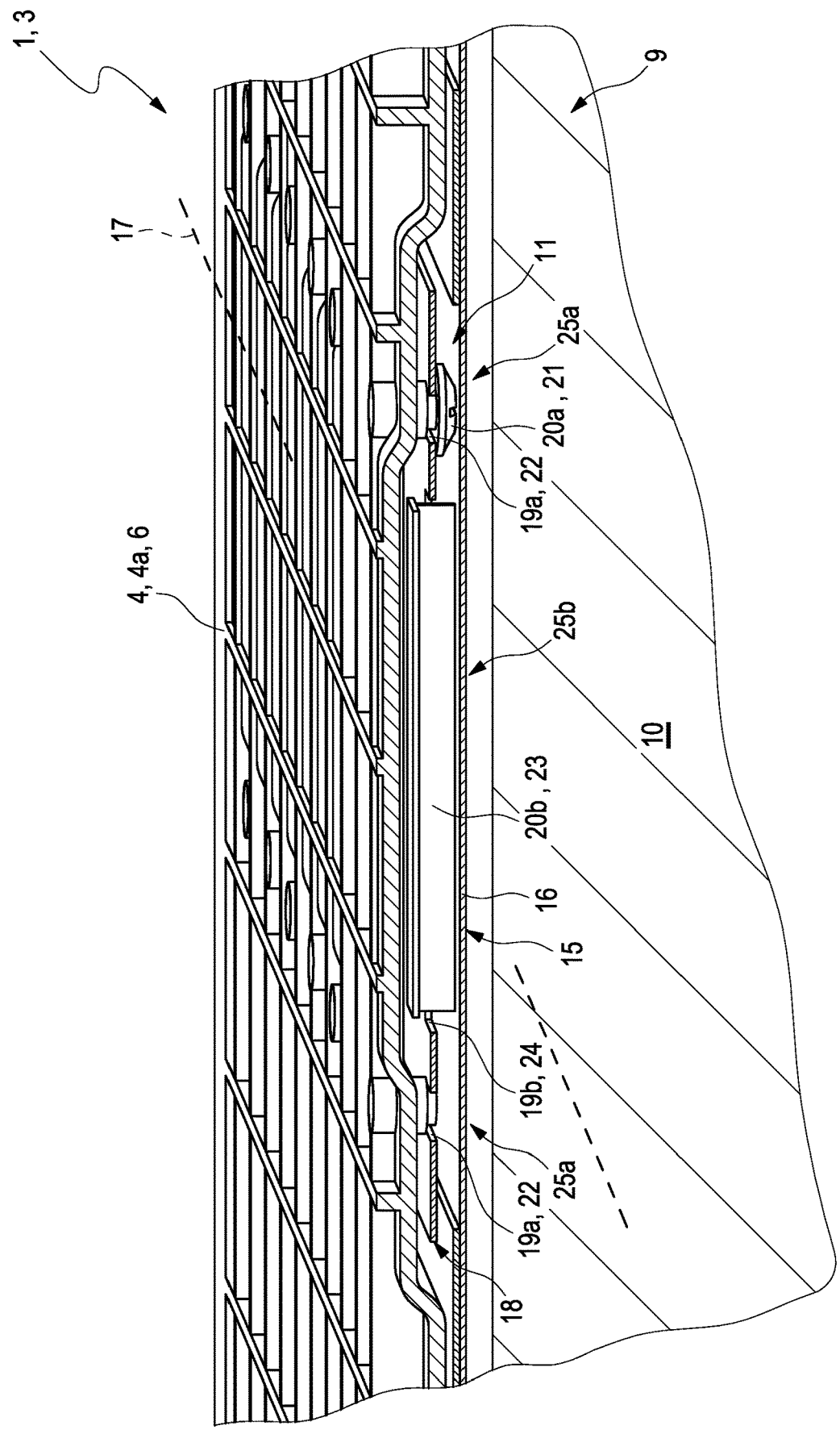
Figure 4:
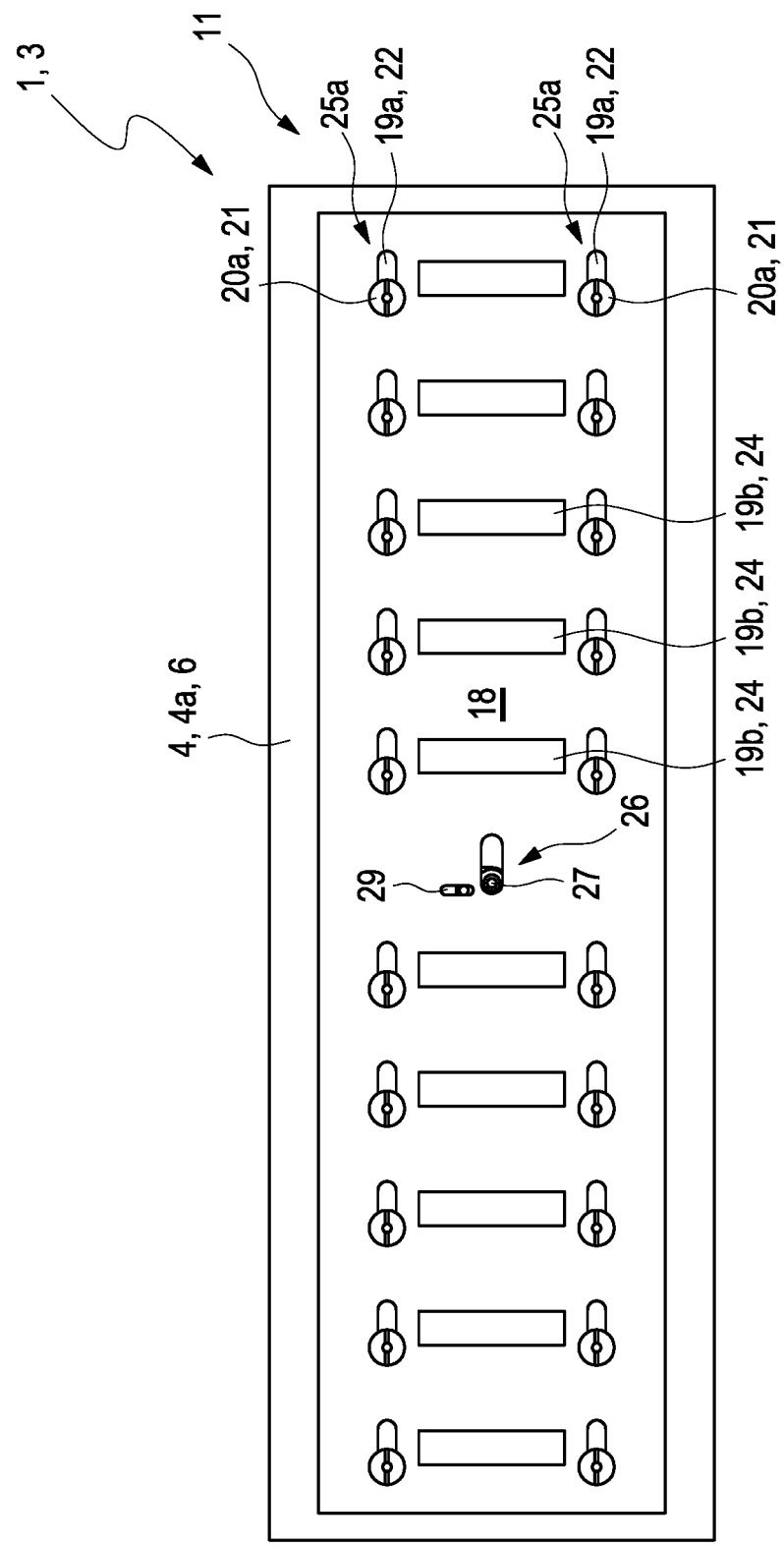
FIG. 4 shows a plan view of a locking device shown in FIG. 2 and in FIG. 3.
Figure 5:
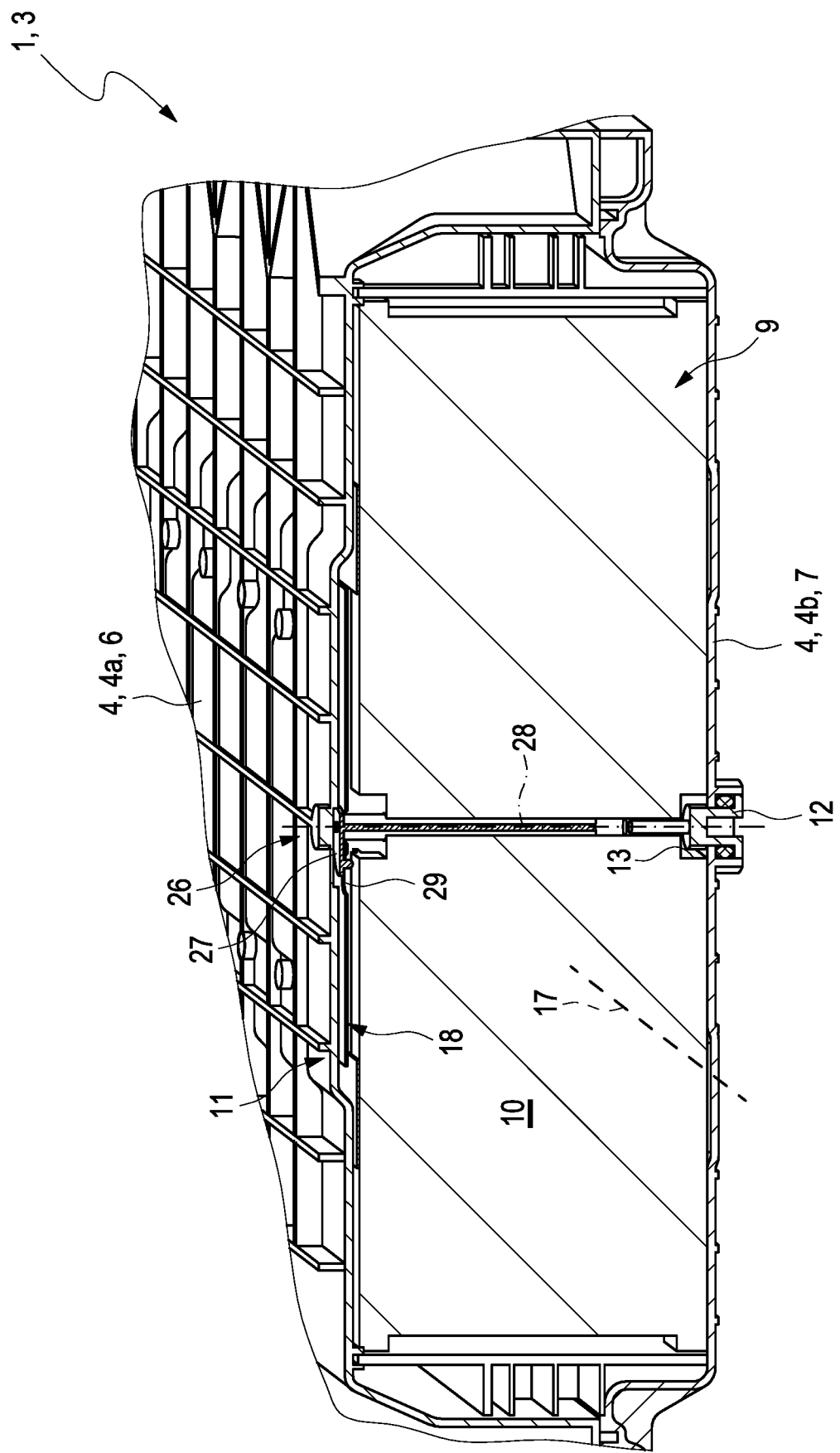
FIG. 5 shows a sectional view of the battery module shown in FIGS. 2 and 3 on an eccentric.

FIG. 2 and FIG. 3 show sectional views of the battery module 3 in the first embodiment. For the sake of clarity, no module housing 4 or the first housing part 4a is shown in FIG. 2. FIG. 4 shows a plan view of the locking device 11. Here, no battery cell stack 10 is shown for the sake of clarity. FIG. 5 shows a sectional view of the battery module 3. In FIG. 2 to FIG. 4, the battery module 3 is shown in the first embodiment, in which the locking device 11 is arranged on the first housing part 4a and thus between the battery cell stack 10 and the container 6. The second housing part 4b or the respective cover 7 can then be non-detachably connected—for example glued—to the battery stack 10.

Making reference to FIG. 2, the battery cell stack 10 comprises multiple battery cells 14 which are stacked against one another in a stack direction 17. The individual battery cells 14 are each positioned against one another and held against one another by means of a cell holder 15. The cell holders 15 are stacked with the battery cells 14 and each comprise a frame or collar 16 which circulates about the adjacent battery cells 14 with respect to the stack direction 17 in the circumferential direction. The adjacent cell holders 15 engage into one another in the stack direction 17 so that the battery cells 14 and the cell holders 15 are fixed relative to one another.

Making reference to FIG. 3, the locking device 11 comprises a bolt plate 18 which is arranged between the first housing part 4a and the battery cell stack 10. On the bolt plate 18, multiple first bolt structures 19a and multiple second bolt structures 19b are then formed. Furthermore, the locking device 11 comprises multiple housing-side first engagement elements 20a and multiple stack-side second engagement elements 20b. The housing-side first engagement elements 20a are arranged fixed along the stack direction 17 distributed on the module housing 4—here on the first housing part 4a—and practically formed complementarily to the first bolt structures 19a. Thus, the housing-side first engagement elements 20a are formed by screws 21 and the first bolt structures 19a by elongated holes 22. The elongated holes 22 are orientated in the stack direction 17 and have a smaller diameter than heads of the screws 21, as is noticeable in particular in FIG. 2 and FIG. 4. By way of this the longitudinal guide of the bolt plate 18 is realised and the bolt plate 18 adjustable from a locking position into an unlocking position. In other words, the screws 21 slidably fix the bolt plate 18 on the module housing 4 in the stack direction 17. The housing-side first engagement elements 20a and the first bolt structures 19a are permanently engaged with one another and form the housing-side locking points 25a.

The multiple stack-side second engagement elements 20b are arranged distributed along the stack direction 17 fixed on the battery cell stack 10 and practically formed complementarily to the second bolt structures 19b. Here, the stack-side second engagement elements 20b are integrally formed on the cell holders 17 as is noticeable in particular in FIG. 2. Here, the same are formed by a T-shaped web 23 which extends transversely to the stack direction 17. The second bolt structures 19b of the bolt plate are then formed by passage openings 24 so that the webs 23 can engage behind these. In FIG. 2, the bolt plate 18 is brought into the locking position. Here, a portion of the respective web 23 engages behind the bolt plate 18 through the associated passage opening 24 and is arranged between the bolt plate 18 and the module housing 4, here the first housing part 4a. This produces a form-fitting connection between the bolt plate 18 and the battery cell stack 10 and multiple stack-side locking points 25b are formed. In the unlocking position, the form-fitting connection between the bolt plate 18 and the battery cell module 10 is disconnected and the battery cell stack 10 can be removed from the bolt plate 18.

Here, the housing-side locking points 25a are arranged in two rows and the stack-side locking points 25b are arranged in a row as is noticeable in particular in FIG. 4. Here, two housing-side locking points 25a are provided for each stack-side locking point 25b. If the battery module 3 is mounted to the vehicle floor 5—as shown in FIG. 1—a tensile force direction runs from the top down and perpendicularly to the stack direction. The weight of the respective battery cell stack 10 is transmitted via the stack-side locking points 25b to the bolt plate 18 and via the housing-side locking points 25a to the first housing part 4a.

The bolt plate 18 is arranged in the module housing 4 in such a manner that it is not accessible from the outside. For adjusting and/or for driving the bolt plate 18 between the unlocking position and the locking position, an actuating device 26 is provided, as is also shown in FIG. 4 and FIG. 5. Here, the actuating device 26 is an eccentric 27 that is rotatable about an axis of rotation and drive-coupled to the bolt plate 18. Here, the axis of rotation is orientated parallel to the tensile force direction. Here, the eccentric 27 penetrates the bolt plate 18 and engages in a driver opening 29 in the bolt plate 18 spaced apart radially from the axis of rotation 28. Here, the eccentric 27 penetrates the battery cell stack 10 perpendicularly to the stack direction 17 and can be reached and actuated via the drain opening 13—see FIG. 1 in this regard.

Figure 6:
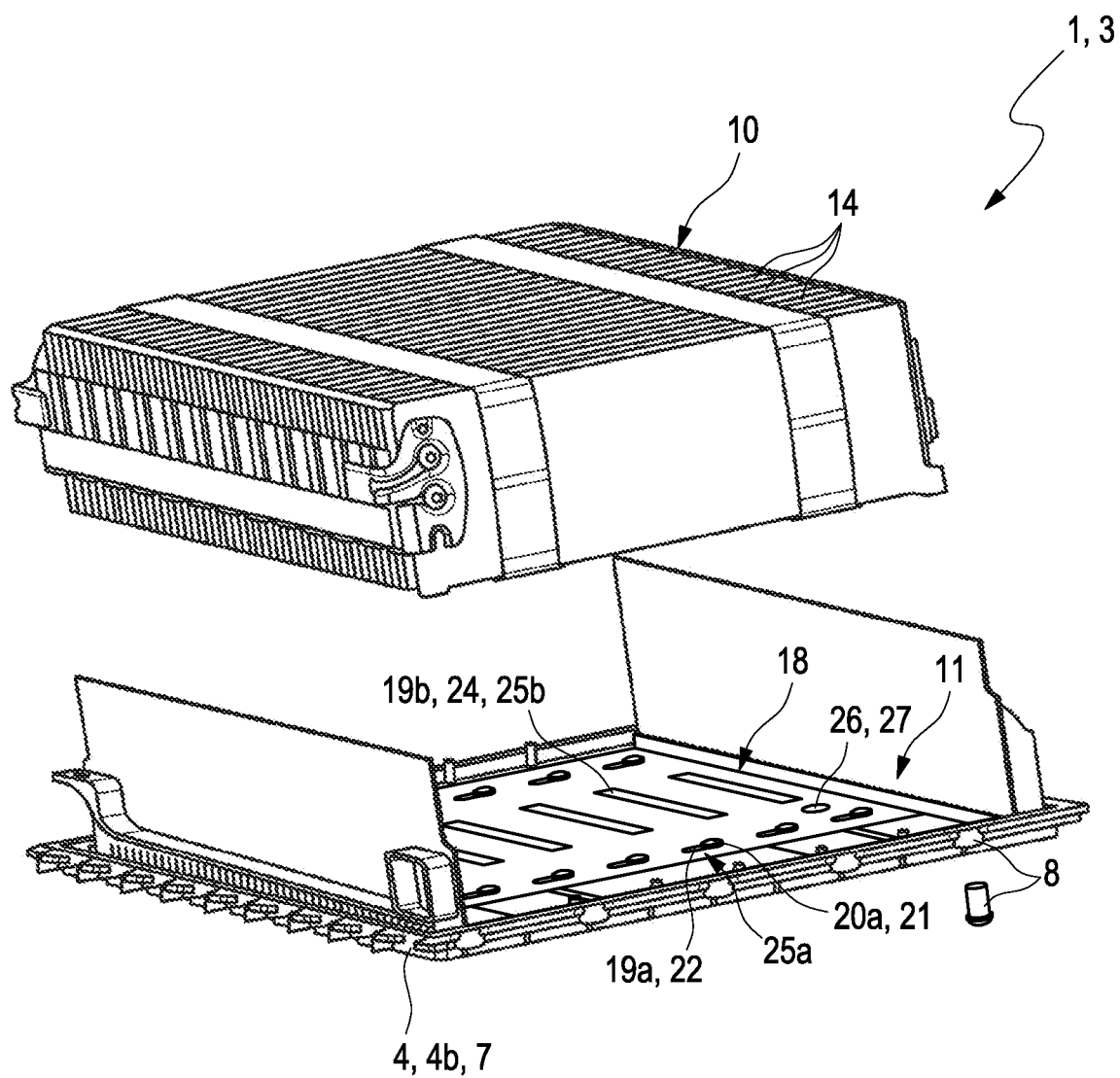
FIG. 6 shows an exploded view of the battery module according to the invention in a second embodiment.

FIG. 6 now shows an exploded view of the battery module 3 in the second embodiment. Here, the battery stack 10 and the second housing part 4b or the cover 7 are shown, wherein the locking device 11 is arranged on the second housing part 4b. In the second embodiment, the eccentric 27 does not have to penetrate the battery stack 10 and can be reached and actuated in the same way via the drain opening 13—see FIG. 1 in this regard. Otherwise the construction of the battery module 3 corresponds to that of the first embodiment.

The invention claimed is:

1. A battery module for a traction battery, comprising:
a module housing;
at least one battery cell stack arranged within an interior space of the module housing;
the at least one battery cell stack including a plurality of battery cells arranged one after another along a stack direction;
the plurality of battery cells arranged within the module housing such that a coolant flowable through the module housing directly contacts the plurality of battery cells; and
wherein a locking mechanism form-fittingly connects the at least one battery cell stack to the module housing via (i) a plurality of housing-side locking points and (ii) a plurality of stack-side locking points; wherein the locking mechanism includes a plurality of housing-side first engagement elements arranged within the interior space, the plurality of housing-side first engagement elements distributed along the stack direction and coupled to the module housing; the locking mechanism further includes a plurality of stack-side second engagement elements arranged within the interior space, the plurality of stack-side second engagement elements distributed along the stack direction and coupled on the at least one battery cell stack; and the locking mechanism further includes a bolt plate, the bolt plate including a plurality of first bolt structures structured complementary to the plurality of housing-side first engagement elements and a plurality of second bolt structures structured complementary to the plurality of stack-side second engagement elements.

2. The battery module according to claim 1, wherein:
the plurality of housing-side first engagement elements and the plurality of first bolt structures are permanently in engagement with one another and define the plurality of housing-side locking points;
the plurality of housing-side locking points define a longitudinal guide for the bolt plate and are configured to transmit tensile forces extending in a tensile force direction between the bolt plate and the module housing; and
the tensile force direction extends transversely to the stack direction.

3. The battery module according to claim 2, wherein:
the bolt plate is adjustable in the stack direction relative to the module housing to a locking position and to an unlocking position;
when the bolt plate is in the locking position, the plurality of stack-side second engagement elements and the plurality of second bolt structures are engaged with one another and form the plurality of stack-side locking points such that tensile forces extending in the tensile force direction are transmittable between the bolt plate and the at least one battery cell stack; and
when the bolt plate is in the unlocking position, the plurality of second bolt structures and the plurality of stack-side second engagement structures are not engaged with one another such that the at last one battery cell stack is removable from the bolt plate.

4. The battery module according to claim 3, further comprising an actuating mechanism structured and arranged to at least one of adjust and drive the bolt plate into the unlocking position and into the locking position.

5. The battery module according to claim 4, wherein the actuating mechanism includes at least one of:
an eccentric rotatably arranged about an axis of rotation extending parallel to the tensile force direction and drive-coupled to the bolt plate such that the eccentric is accessible from an outside of the module housing;
a slide slidable along the stack direction and drive-coupled to the bolt plate such that the slide is accessible from the outside of the module housing; and
an actuator that is drive-coupled to the bolt plate and that is actuatable via an electronic control system.

6. The battery module according to claim 3, wherein:
the plurality of stack-side second engagement elements are structured as a plurality webs respectively having one of a T-shape and a L-shape, the plurality of webs extending transversely to the stack direction and transversely to the tensile force direction;
the plurality of second bolt structures are structured as a plurality of passage openings configured complementarily to the plurality of webs; and
when the bolt plate is in the locking position, a portion of each of the plurality of webs engages an associated passage opening of the plurality of passage openings on a side of the bolt plate facing away from the at least one battery cell stack forming a form-fitting connection in the tensile force direction.

7. The battery module according to claim 6, wherein:
the plurality of housing-side first engagement elements are structured as a plurality of mushroom-like structures each having a head and a shank, the head having a cross sectional area that is larger than a cross sectional area of the shank;
the plurality of first bolt structures are structured as a plurality of elongated holes orientated parallel to the stack direction; and
at least one of the plurality of housing-side first engagement elements is arranged such that (i) the shank is fastened to the module housing and penetrates an associated elongated hole of the plurality of elongated holes and (ii) the head is arranged on a side of the bolt plate facing the at least one battery cell stack and engages behind the bolt plate transversely to the tensile force direction.

8. The battery module according to claim 2, wherein:
the plurality of housing-side first engagement elements are structured as a plurality of mushroom-like structures each having a head and a shank, the head having a cross sectional area that is larger than a cross sectional area of the shank;
the plurality of first bolt structures are structured as a plurality of elongated holes orientated parallel to the stack direction; and at least one of the plurality of housing-side first engagement elements is arranged such that (i) the shank is fastened to the module housing and penetrates an associated elongated hole of the plurality of elongated holes and (ii) the head is arranged on a side of the bolt plate facing the at least one battery cell stack and engages behind the bolt plate transversely to the tensile force direction.

9. The battery module according to claim 1, wherein:
within the at least one battery cell stack, the plurality of battery cells are each arranged against one another and held against one another via a plurality of cell holders; and
the plurality of stack-side second engagement elements are disposed on the plurality of cell holders.

10. The battery module according to claim 1, wherein:
the module housing includes (i) a first housing part couplable to a vehicle floor of a vehicle and (ii) a second housing part;
the plurality of housing-side first engagement elements are disposed on the second housing part; and
the second housing part is detachably fixed on the first housing part.

11. The battery module according to claim 10, wherein the second housing part is secured to the first housing part via a screwed connection.

12. The battery module according to claim 1, wherein:
the module housing includes (i) a first housing part couplable to a vehicle floor of a vehicle and (ii) a second housing part;
the plurality of housing-side first engagement elements are disposed on the first housing part;
the at least one battery cell stack is attached to the second housing part; and
the second housing part is detachably fixed on the first housing part.

13. The battery module according to claim 12, wherein the at least one battery cell stack is non-detachably coupled on the second housing part via a glued connection.

14. The battery module according to claim 1, further comprising a plurality of separate locking mechanisms including the locking mechanism, and wherein the at least one battery cell stack includes a plurality of battery cell stacks which are individually coupled to the module housing via an associated locking mechanism of the plurality of locking mechanisms.

15. A traction battery for an electric or hybrid vehicle, comprising at least one battery module including:
a module housing through which a coolant is flowable;
at least one battery cell stack arranged within an interior space of the module housing;
the at least one battery cell stack including a plurality of battery cells arranged one after another along a stack direction;
wherein the plurality of battery cells are disposed within the module housing such that the coolant directly contacts the plurality of battery cells; and
wherein a locking mechanism form-fittingly connects the at least one battery cell stack to the module housing via (i) a plurality of housing-side locking points and (ii) a plurality of stack-side locking points; wherein the locking mechanism includes a plurality of housing-side first engagement elements arranged within the interior space, the plurality of housing-side first engagement elements distributed along the stack direction and coupled to the module housing; the locking mechanism further includes a plurality of stack-side second engagement elements arranged within the interior space, the plurality of stack-side second engagement elements distributed along the stack direction and coupled on the at least one battery cell stack; and the locking mechanism further includes a bolt plate, the bolt plate including a plurality of first bolt structures structured complementary to the plurality of housing-side first engagement elements and a plurality of second bolt structures structured complementary to the plurality of stack-side second engagement elements.

16. The traction battery according to claim 15, wherein one of:
the at least one battery module includes a single battery module such that the single battery module forms the traction battery; and
the at least one battery module includes a plurality of battery modules each arranged in a common battery housing.

17. A battery module for a traction battery, comprising:
a module housing through which a coolant is flowable;
at least one battery cell stack arranged within an interior space of the module housing;
a locking mechanism form-fittingly connecting the at least one battery cell stack to the module housing;
the at least one battery cell stack including a plurality of battery cells arranged one after another along a stack direction such that the coolant directly contacts the plurality of battery cells; and
wherein the locking mechanism includes a bolt plate, the bolt plate including (i) a plurality of first bolt structures connectable to the module housing and (ii) a plurality of second bolt structures connectable to the at least one battery cell stack; wherein the bolt plate is adjustable in the stack direction relative to the module housing to a locking position and to an unlocking position; when the bolt plate is in the locking position, the plurality of second bolt structures are connected to the at least one battery cell stack such that tensile forces are transmittable between the bolt plate and the at least one battery cell stack; and when the bolt plate is in the unlocking position, the plurality of second bolt structures are not coupled to the at least one battery cell stack such that the at last one battery cell stack is removable from the bolt plate.

18. The battery module according to claim 17, wherein:
the plurality of first bolt structures are structured as a plurality of elongated holes; and
the plurality of second bolt structures are structured as a plurality of passage openings.

* * * * *